Figure 1:
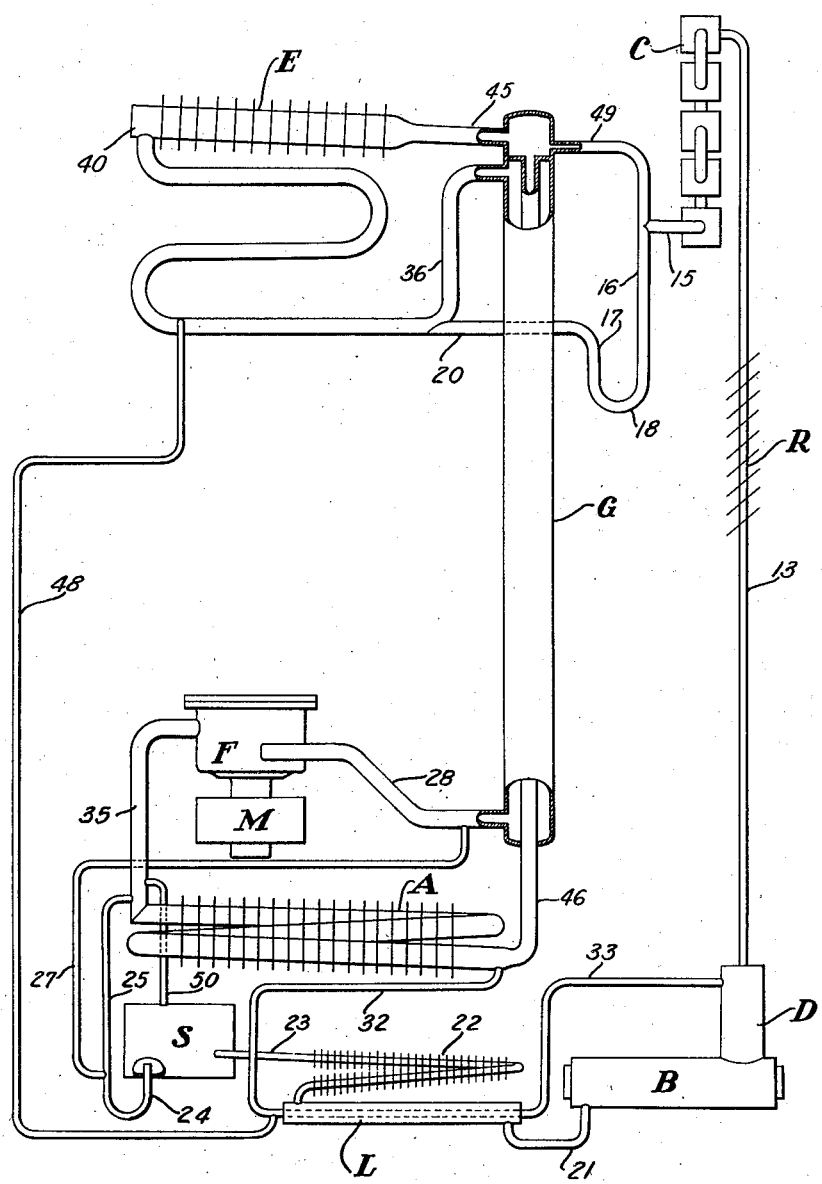

Nov. 21, 1944.　　　C. C. COONS　　　2,363,400
REFRIGERATION
Filed Oct. 11, 1941　　　2 Sheets-Sheet 1

INVENTOR
*Curtis C. Coons*
BY
*Harry S. Demarest*
ATTORNEY

Nov. 21, 1944.  C. C. COONS  2,363,400
REFRIGERATION
Filed Oct. 11, 1941  2 Sheets-Sheet 2

INVENTOR
Curtis C. Coons
BY
Harry S. Ducasse
ATTORNEY

Patented Nov. 21, 1944

2,363,400

UNITED STATES PATENT OFFICE 2,363,400

REFRIGERATION

Curtis C. Coons, North Canton, Ohio, assignor to The Hoover Company, North Canton, Ohio, a corporation of Ohio Application October 11, 1941, Serial No. 414,593

15 Claims. (Cl. 62—119.5)

This invention relates to refrigeration and more particularly to an absorption refrigerating apparatus of the type using an inert pressure equalizing medium for equalizing the pressures within the system and power-driven means for circulating the mediums in the system.

In refrigerating apparatus of this type it is necessary that some means be provided for lubricating the moving parts of the power-driven means, and since these moving parts are usually sealed within the interior of the system, it is necessary to provide some means which will be operative for long periods of time, and in which the lubricant will be retained in the part of the system in which it is useful and not be dissipated to other parts of the system.

One way of lubricating the moving parts of a power-driven means for circulating the medium in an absorption refrigerating apparatus, is to provide a motor fan unit in which the motor rotor is submerged in the lubricant at all times. It is therefore necessary to place the motor fan unit in some part of the apparatus which is normally inaccessible to the liquid mediums in the system during operating periods as well as to prevent mixing of the oil and the refrigerating mediums during shipment or during other handling operation.

It is therefore an object of this invention to provide a motor fan unit for circulating the mediums in an absorption refrigerating apparatus in which the motor rotor is submerged in a lubricant, in which the motor fan unit is placed in that part of the system inaccessible to liquid mediums during operating periods and in which means is provided for preventing the lubricant from getting out of the motor during shipment or other handling operations.

When a lubricant comes into contact with a refrigerating medium, such as ammonia, some of the ammonia vapor inevitably is absorbed by the lubricant and when the pressure is released this vapor expands causing the lubricant to boil or foam. When the lubricant boils or foams, some of the lubricant will pass off with the escaping ammonia vapors.

In an absorption refrigerating apparatus of the type using ammonia as a refrigerant, water as the absorbent and a pressure equalizing medium, the total pressure within the system varies considerably between running and idle periods depending upon the duration of the "on" and "off" periods and upon the amount of heat supplied to the boiler during "off" periods. Now if a lubricant is used for lubricating the moving parts of the apparatus, this variation in pressure will cause some boiling off of the ammonia vapor from the lubricant and eventually cause the lubricant being dispersed to other parts of the apparatus unless some means is provided to prevent it.

It is therefore another object of this invention to provide an absorption refrigerating apparatus having power means for circulating the medium in which the moving parts are lubricated, with means for preventing the escape of the lubricant to other parts of the apparatus.

In absorption refrigerating apparatus, using ammonia as a refrigerant, a corrosion inhibiter such as sodium chromate is usually provided in the solution circuit to prevent corrosion of the metal forming the solution circuit by the ammonia. Now if the lubricant should reach the solution circuit and become heated it will break down into fatty acids, which acids will react with the sodium chromate to form metallic soaps. These soaps are a gummy gelatinous mass and would eventually clog the conduits forming the solution circuit.

More particularly it is an object of this invention to provide a motor fan unit for circulating the mediums in an absorption refrigerating apparatus in which a porous partition having capillary interstices, separates the fan from the motor rotor and forms with the rotor casing a reservoir which will retain by capillary attraction all of the lubricant in the rotor casing regardless of the position in which the apparatus is placed during shipment or other handling operation, which will break up the bubbles of refrigerant vapor escaping from the lubricant during pressure variations in the system and which will prevent the lubricant from coming into contact with the sodium chromate corrosion inhibiter in the solution circuit.

Figure 2:
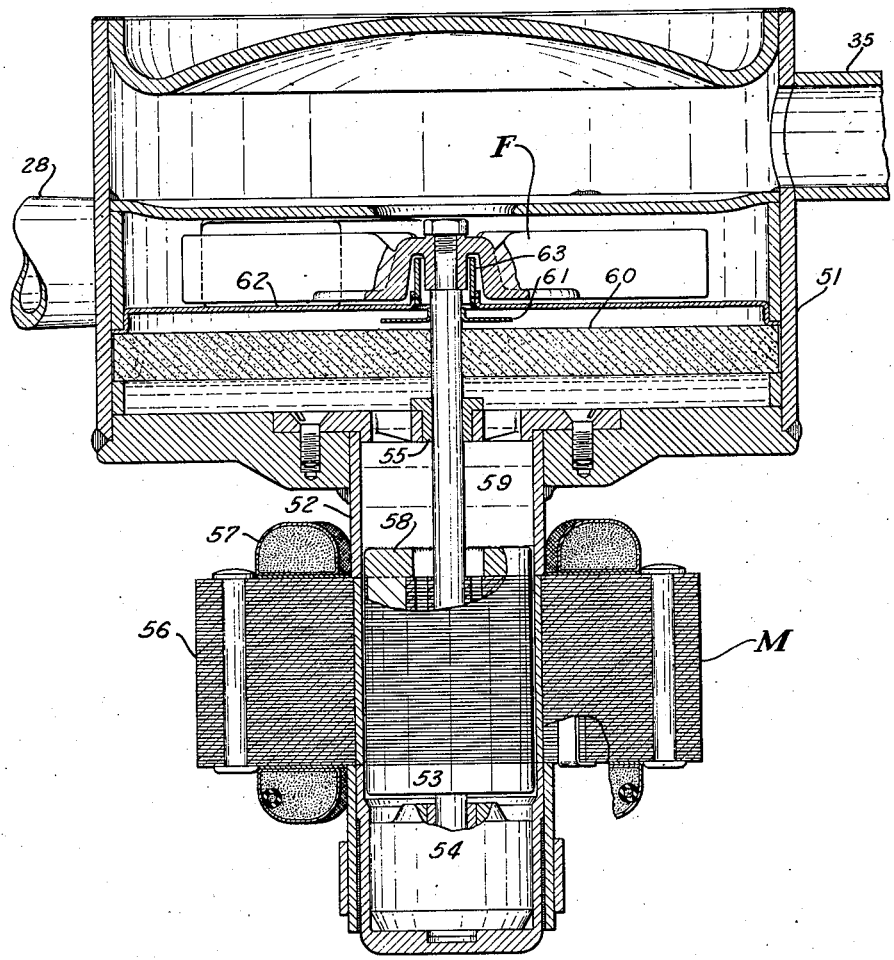

Other objects and advantages of this invention will become apparent as the description proceeds when taken in connection with the accompanying drawings in which:

Figure 1 is a diagrammatic view of an absorption refrigerating apparatus with the motor fan unit of this invention applied thereto; and Figure 2 is a longitudinal sectional view of the motor fan unit of this invention.

Referring to Figure 1 of the drawings, there is disclosed a three-fluid absorption refrigerating system comprising a boiler B, an analyzer D, an air-cooled rectifier R, a tubular air cooled condenser C, an evaporator E, a gas heat exchanger G, a tubular air-cooled absorber A, a solution reservoir S, a liquid heat exchanger L, and a circulating fan F, which is driven by an electric motor M.

The above described elements are interconnected by various conduits to form a plurality of gas and liquid circuits constituting a complete refrigerating system to which reference will be made in more detail hereinafter.

The refrigerating system will be charged with a suitable refrigerant, such as ammonia, a suitable absorbent, such as water, a suitable pressure equalizing medium, such as nitrogen, and a suitable corrosion inhibiter, such as sodium chromate dissolved in the absorbent.

The boiler B will be heated in any suitable manner such as by an electrical cartridge heater or by any well known gas burner as may be desired.

The application of heat to the boiler B liberates refrigerant vapor from strong solution contained therein. Vapor so liberated passes upwardly through the analyzer D in counterflow relationship to strong solution flowing downwardly therethrough. Further refrigerant vapor is generated in the analyzer by the heat of condensation of absorption solution vapor generated in the boiler. Refrigerant vapor is conducted from the upper portion of the analyzer D to the upper portion of the condenser C through a conduit 13 which includes the air-cooled rectifier R wherein any vapor of absorption solution passing through the analyzer is condensed and returned to the analyzer through the conduit 13.

The refrigerant vapor is liquefied in the condenser by heat exchange relationship with atmospheric air and is discharged from the bottom portion thereof through a conduit 15 into a downwardly extending conduit 16. The bottom portion of the conduit 16 connects to the bottom portion of an upwardly extending conduit 17 through a U-bend 18. The conduit 16 is appreciably longer than the conduit 17 for a purpose to be described later. The conduit 17 at its upper end opens into a conduit 20 which discharges into the evaporator in a manner to be described more fully hereinafter.

The weak solution formed in the boiler by the generation of refrigerant vapor therefrom is conveyed from the boiler through the conduit 21, the outer pass of liquid heat exchanger L, through the pre-cooler 22 and a conduit 23 into the solution reservoir S. The weak solution is conveyed from the solution reservoir S through a U-shaped conduit 24 opening into an upwardly extending tube 25 of small diameter, forming a gas lift pump which discharges into the top of the absorber A. It is evident that the top of the absorber is materially above the solution level normally prevailing in the boiler-analyzer-reservoir system whereby some means must be provided to elevate the absorption solution to the top of the absorber A. For this purpose a small bleed conduit 27 is connected to the discharge conduit 28 of the circulating fan and leads to the junction of the conduits 24 and 25 which is below the solution level normally prevailing in the reservoir whereby the weak solution is elevated to the top of the absorber by gas lift action.

In the absorber, the weak solution flows downwardly by gravity in counterflow to the rich pressure equalizing medium refrigerant vapor mixture flowing upwardly therethrough. The refrigerant vapor content of the mixture is absorbed in the absorption solution and the heat of absorption is rejected to the surrounding air by air cooling fins which are mounted on the exterior walls of the absorber conduits. The strong solution formed in the absorber discharges into conduit 32 which opens into the inner pass of liquid heat exchanger L. From the inner pass of the liquid heat exchanger L, the strong solution is conveyed to the upper portion of the analyzer D by conduit 33 whereby it flows downwardly through the analyzer in counterflow to the rising vapors generated in the boiler.

The weak pressure equalizing medium refrigerant vapor mixture present in the absorber A is taken from the upper portion thereof through the conduit 35 into the suction side of the circulating fan in which it is placed under pressure and discharged through conduit 28 into the outer pass of the gas heat exchanger G and therefrom through a downwardly extending conduit 36 into the bottom of the evaporator E.

The conduit 20 opens into the bottom portion of the conduit 36 whereby the liquid refrigerant supplied to the evaporator enters simultaneously with the pressure equalizing medium which is placed under pressure by the circulating fan F. The diameter of the conduit of the evaporator is relatively small whereby the pressure equalizing medium flows through it at a relatively high velocity. The rapidly flowing pressure equalizing medium sweeps or drags the liquid refrigerant with it through the evaporator into the box cooling conduit 40 as the refrigerant is evaporated by diffusion into the pressure equalizing medium to produce refrigeration. In the conduit 40 the velocity of the inert gas stream is relatively slow by reason of the large diameter of that conduit and the liquid refrigerant flows therethrough by gravity. Any liquid refrigerant not evaporated in the evaporator will flow through conduit 45, the inner pass of gas heat exchanger G and pass by conduit 46 to the bottom of the absorber.

The rich pressure equalizing medium refrigerant vapor mixture formed in the evaporator is conducted therefrom into the inner pass of the gas heat exchanger G through the conduit 45. The opposite end of the gas heat exchanger G communicates with the bottom portion of the absorber through a conduit 46. In the absorber A the rich pressure equalizing medium refrigerant vapor mixture moves upwardly in counterflow to absorption solution whereby the refrigerant vapor content of the mixture is absorbed by the weak solution.

The bottom coil of the evaporator E is provided with a drain conduit 48 which opens into the strong solution discharge conduit 32. The conduit 48 opens into the top portion of the bottom coil of the evaporator so that it will not completely drain such conduit. The upper portion of the discharge conduit 15 of the condenser is vented through a vent conduit 49 into the inner pass of the gas heat exchanger G. The solution reservoir S is vented through a conduit 50 into the suction conduit 35 of the circulating fan F.

The circulating fan F places the pressure equalizing medium discharged therefrom under a small pressure in the neighborhood of a pressure of five inches of water over that prevailing on the suction side of the fan. In order to prevent this pressure, which also prevails in the conduit 36, from being carried back through the condenser conduit and conduit 13 to the analyzer, the conduit 16 is made appreciably longer than the conduit 17 to form a pressure balancing column of liquid in the conduit 16 which extends above the point of connection between the conduits 17 and 20 a distance sufficient to overcome the pressure produced by the circulating fan in the conduit 36.

The motor fan unit comprising a fan casing 51, and a cylindrical shell 52 forming a housing for the fan F and the motor rotor 53. The motor rotor 53 is connected to the fan F by a shaft which is suitably supported for rotation by bearing assemblies 54 and 55. On the exterior of the shell 52, opposite the rotor 53, is the field stack 56 having windings 57. The rotor 53 has cast aluminum conductor bars and end rings 58 and is submerged in a lubricant 59 in the interior of the shell 52.

In order to hold the lubricant 59 in the interior of the shell 52 when the apparatus is being handled such as during shipment, to prevent it from being floated away by liquid mediums which may enter the casing 51 and to break up bubbles of refrigerant vapor which boil therefrom during pressure variations within the apparatus, a porous partition 60 is provided. The partition 60 may be made of any suitable material having capillary interstices of a size sufficiently small to prevent the lubricant from passing therethrough and so that the surface tension of the lubricant will retain the lubricant in the shell 52 at all times. Examples of such materials are unglazed pottery, powdered or sintered metal or a thick stack of fine mesh screen.

The partition 60 is first wetted with oil and the shell 52 filled with oil so that its level just reaches the partition 60. The partition 60 would ordinarily act as a wick and absorb the oil into it but since it is already oil soaked the lubricant level in the shell 52 will remain the same.

During operation the oil will expand and contract as the motor heats up and cools down. The partition 60, however, is made thick enough to take care of this expansion and contraction and may be in the neighborhood of ¼ to ½ an inch in thickness.

The clearness between the shaft and the partition 60 is also made very small so as to act as a capillary. Thus if any liquid from the system should reach the space above the partition 60 it would be repelled by the surface tension of the oil filling the interstices of the partition 60 and will not displace the oil in the shell 52. In addition if the unit should be tilted during shipment the oil in the shell 52 can not escape as it will be held at the outer surface of the partition 60 by the surface tension of the oil in the interstices of the partition.

Also during operation when the internal pressures of the system rise and fall, the refrigerant vapor bubbles which rise from the oil 59 in the shell 52 will be broken up by the porous partition 60 and therefore will not carry the oil with them to other parts of the system.

A throw-off ring 61 is secured to the shaft to prevent any oil which might rise above the partition 60 from creeping up the shaft. Above the partition 60 is a metallic plate 62 having an upwardly extending annulus 63 which enters a recess in the lower side of the fan F. Any liquid which may flow into or condense in casing 51 will be prevented from falling downwardly on top of the partition 60 by the annulus 63 and will drain by gravity through conduits 26 and 27 back to the solution circuit.

From the foregoing it can be seen that this invention provides a simple method of preventing the oil from leaving the shell 52 by the surface tension of the oil itself.

While I have shown but a single embodiment of my invention, it is to be understood that this embodiment is to be taken as illustrative only and not in a limiting sense. I do not wish to be limited to the specific structure shown and described but to include all equivalent variations thereof except as limited by the scope of the claims.

I claim:

1. A refrigerating apparatus of the type in which the internal pressures vary during operation comprising, a power unit for circulating mediums in the apparatus, said power unit including a motor rotor submerged in a lubricant, and a porous plate having capillary interstices separating the rotor from other parts of the apparatus whereby refrigerant dissolved in the lubricant will not carry the lubricant with it to other parts of the apparatus as the internal pressures vary.

2. A refrigerating apparatus comprising, a power unit for circulating mediums within the apparatus, said power unit including a motor rotor surrounded by a lubricant and a porous plate having capillary interstices in contact with the lubricant surrounding the rotor and separating the rotor from other parts of the apparatus whereby the lubricant can expand and contract by entering and draining from the interstices of said plate and be retained from being dissipated to other parts of the apparatus.

3. An absorption refrigerating apparatus comprising, a closed circuit for the circulation of an inert medium, a vertically positioned motor fan unit for circulating said medium including a motor rotor surrounded by a lubricant and porous plate separating the motor rotor and the fan.

4. An absorption refrigerating apparatus comprising a closed circuit for the circulation of an inert medium, a vertically positioned motor fan unit for circulating said medium, hermetically sealed within the walls of said circuit including a motor rotor surrounded by a lubricant and a porous plate in contact with said lubricant and separating the motor rotor and the fan.

5. An absorption refrigerating apparatus comprising a closed circuit for the circulation of an inert gas and being subject to an accumulation therein of liquid mediums with which the apparatus is charged, a vertically positioned motor fan unit for circulating said inert medium, hermetically sealed within the walls of said circuit including a motor rotor surrounded by a lubricant and a porous plate wetted with lubricant in contact with said lubricant and separating the motor rotor and fan whereby the lubricant is retained in one side of said plate and any liquid medium accumulating in said circuit is retained on the other side of said plate.

6. In a refrigerating apparatus of the type containing a liquid working medium and having a power unit containing a lubricant, that improvement which consists in a separator positioned to maintain the liquid working medium and the lubricant on opposite sides thereof, said separator being in the form of a porous member having capillary interstices.

7. In an absorption refrigerating apparatus having power means for circulating an inert gas therein in which the power means include an oil pocket, that improvement which consists in a separator positioned to separate said pocket from the remainder of the apparatus, said separator being in the form of a partition having capillary interstices.

8. In a refrigerating apparatus of the type containing a liquid working medium having a power unit containing a lubricant, that improvement which consists in a separator positioned to maintain the liquid working medium and the lubricant on opposite sides thereof, said separator being in the form of a porous member having capillary interstices and being wetted with the lubricant.

9. In an absorption refrigerating apparatus having power means for circulating an inert gas therein in which the power means includes an oil pocket, that improvement which consists in a separator positioned to separate said pocket from the remainder of the apparatus, said separator being in the form of a partition having capillary interstices and being wetted with oil.

10. In an absorption refrigerating apparatus which contains a liquid medium therein which is required to remain in one part of the apparatus during operation thereof, but which is subject to displacement to another part of the apparatus, that improvement which consists in a separator positioned between the two parts of the apparatus, said separator being in the form of a porous member having capillary interstices and being wetted with said medium.

11. In an absorption refrigerating apparatus of the type having operating parts which are subject to being injuriously affected by contact with the liquid mediums in the apparatus, that improvement which consists in a separator positioned between the parts of the apparatus which are subject to injury and the parts containing said liquid medium, said separator being in the form of a porous partition wetted with oil.

12. In a refrigerating apparatus which contains a lubricant which absorbs the refrigerant vapor, that improvement which consists in a separator positioned between that part of the apparatus containing the lubricant and the remainder of the apparatus, said separator being in the form of a porous partition having capillary interstices.

13. In a refrigerating apparatus which contains a lubricant which absorbs the refrigerant vapor, that improvement which consists in a separator positioned between that part of the apparatus containing the lubricant and the remainder of the apparatus, said separator being in the form of a porous partition having capillary interstices and being wetted with the lubricant.

14. The process of maintaining a lubricant and a liquid refrigerating medium in a refrigerating system separated, which comprises utilizing the surface tension of the lubricant and the liquid refrigerating medium to retain them on opposite sides of a porous partition.

15. In a three-fluid absorption refrigerating apparatus of the type utilizing power operated means for circulating the mediums in the apparatus and in which the power operated means is provided with a lubricant filled pocket for lubricating the same, that improvement which consists in a separator positioned between said pocket and the remainder of the apparatus and being of such character that the surface tension of the lubricant retains the lubricant in the pocket.

CURTIS C. COONS.